Oct. 24, 1961
K. JASSNIKER
3,005,518
TURBOMACHINE PLANT, INCLUDING A CLOSED
LUBRICATING, COOLING, AND
SEALING FLUID CIRCUIT
Filed Nov. 26, 1958
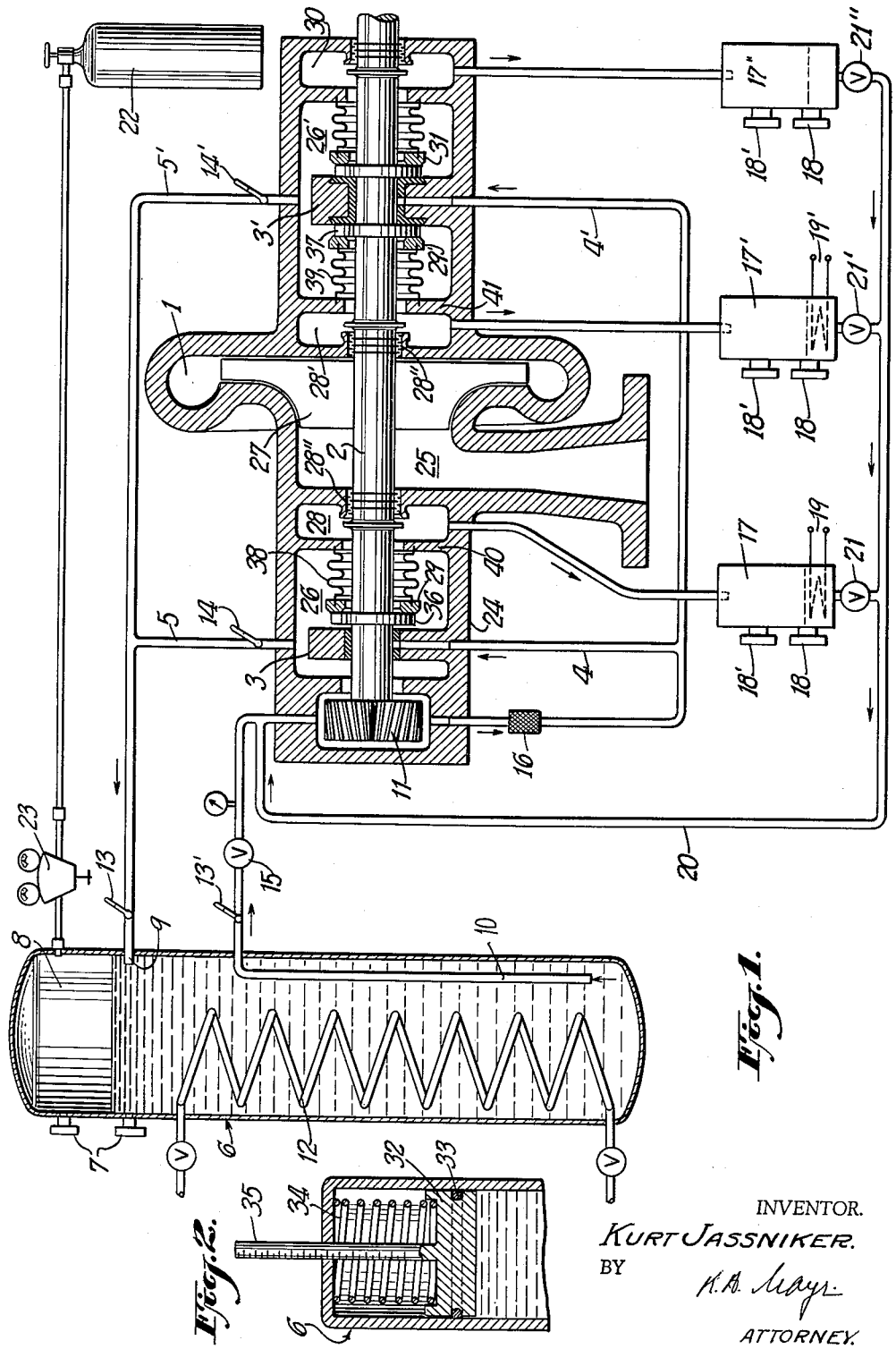
INVENTOR.
KURT JASSNIKER.
BY
K.A. Mayr
ATTORNEY.

United States Patent Office 3,005,518
Patented Oct. 24, 1961

3,005,518
TURBOMACHINE PLANT, INCLUDING A CLOSED LUBRICATING, COOLING, AND SEALING FLUID CIRCUIT
Kurt Jassniker, Winterthur, Switzerland, assignor to Sulzer Freres, S.A., Winterthur, Switzerland, a corporation of Switzerland
Filed Nov. 26, 1958, Ser. No. 776,528
Claims priority, application Switzerland Nov. 29, 1957
5 Claims. (Cl. 184—6)

The present invention relates to a turbomachine plant including a casing housing the rotor and bearings for the rotor shaft, a lubricant for the shaft bearings being circulated in a closed circuit by a pump, the lubricant also serving as sealing fluid for packings separating the part of the casing housing the rotor from parts of the casing housing the bearings and separating the interior of the casing from the outside. The lubricant is also used for removing heat from the casing.

In conventional plants of this type the chamber for the rotor of the turbomachine, for example, the compressor of a cooling plant, is sealed against adjacent parts of the chamber and against the outside for preventing leakage of the operating medium of the compressor to the outside of the compressor chamber and for preventing leakage of air into said chamber, during the periods when the plant is not in operation, by means which are different from the sealing means used when the plant is in operation. When the plant is not in operation spring loaded valve means are used. The valves are sealed by a sealing liquid supplied from a container above the valves to provide the required hydrostatic pressure. In this way leakage of air or operating medium through clearances between the valves and their seats is avoided. If the pressure of the operating medium in the compressor chamber does not appreciably rise above the outside pressure when the machine is not in operation, the aforesaid arrangement is satisfactory.

If the pressure of the operating medium, for example the vapor pressure of the operating medium of a cooling plant, rises considerably, when the compressor is stopped, due to warming up of the machine parts, the conventional sealing provisions are insufficient.

It is an object of the present invention to provide means for maintaining the pressure of the bearing lubricant which also serves as a sealing liquid, at all times above the boiling pressure of the operating medium in the compressor chamber so that escape of operating medium is prevented also when the machine stands still.

The plant according to the invention includes a pressure accumulator operatively connected with or interposed in the closed circuit of the lubricating and sealing liquid whereby a suitable pressure is maintained in the entire circuit when the plant is in operation as well as when it stands still and no pressure is produced by a circulating pump for the lubricating and sealing liquid.

The pressure accumulator may be in the form of a container connected with the circuit which container is partly filled with lubricating liquid, the space in the container above the liquid being filled with a gas under pressure.

Instead of a gas cushion a piston loaded by a spring, by a weight, or other suitable means may be associated with the accumulator vessel for maintaining the desired pressure on the liquid.

It is of advantage to interpose the pressure accumulator in the lubricant circuit and to combine cooling means with the pressure accumulator to cool the lubricating and sealing liquid.

The novel features which are considered characteristic of the invention are set forth with particularity in the appended claims. The invention itself, however, and additional objects and advantages thereof will best be understood from the following description of embodiments thereof when read in connection with the accompanying drawing in which:

FIG. 1 is a part sectional diagrammatic illustration of a plant according to the invention.

FIG. 2 is a sectional view of a modified pressure accumulator forming part of the plant shown in FIG. 1.

Referring more particularly to FIG. 1 of the drawing, numeral 1 designates a turbocompressor having a shaft 2 which is supported by bearings 3 and 3'. The bearings 3 and 3' are lubricated by a lubricant supplied through pipes 4 and 4', respectively. The bearings 3 and 3' are located in cavities 26 and 26' in a casing 24 which includes a chamber 25 in which the rotor 27 of the turbocompressor is located. After lubricating the bearings 3 and 3' the oil flows into the cavities 26 and 26', respectively, and is withdrawn therefrom through pipes 5 and 5', respectively. The latter pipes are united into a single pipe which terminates at 9 in an accumulator vessel 6. The latter is provided with peepholes 7 for observation of the upper and lower liquid level in the vessel 6. The upper space 8 in the vessel which is not occupied by the lubricating liquid is filled with gas, for example, nitrogen, whise pressure is maintained at a predetermined level by conventional means. In the illustrated plant a pressure gas bottle 22 is connected through a reducing valve 23 with the vessel 6 to maintain a predetermined pressure therein.

The lubricant leaves the vessel 6 through an outlet pipe 10 which is provided with a valve 15 and connected with the inlet of a gear pump 11 which is rotated by the shaft 2 of the turbomachine plant. The outlet of the circulating oil pump is connected with the pipes 4 and 4' for supplying lubricating oil to the bearings 3 and 3'.

For removing the heat absorbed by the lubricating of a cooling coil 12 is provided in the accumulator vessel 6. The flow of a coolant through the coil 12 may be controlled in the conventional manner either by hand according to indications of thermometers 13 and 13' provided in the inlet pipe of the pressure vessel 6 and in the outlet pipe 10, respectively, or by conventional automatic means. The oil travels in a closed circuit through the plant, an oil filter 16 being provided at a suitable point of the circuit.

Between the chamber 25 for the compressor rotor 27 and the cavities 26 and 26', accommodating the bearings 3 and 3', cavities 28 and 28', respectively, are provided in which lubricant leaking through oil seals 29 and 29' is collected. An additional cavity 30 is provided adjacent to the point where the shaft 2 extends to the outside of the casing. In the cavity 30 oil is collected which leaks through an oil seal 31, separating the cavity 30 from the cavity 26'.

Oil collected in the cavities 28, 28' and 30 flows into oil receiving containers 17, 17' and 17", respectively. Each of the last mentioned containers is provided with peepholes 18 and 18' for observation of the liquid level in the containers. The pressure of the operating medium in the compressor chamber 25 is usually higher than the pressure in the chambers 28 and 28' which are adjacent to the compressor chamber 25 and separated therefrom by labyrinth packings 28". Therefore, medium will leak from the chamber 25 into the cavities 28 and 28'. In order to expel the medium in which the compressor operates and which has leaked into the cavities 28 and 28' from the lubricant collecting in the containers 17 and 17', heating coils 19 and 19' are provided in the lower parts of the containers 17 and 17'. The leakage oil collecting in the bottom of the containers 17, 17' and 17" is periodically relieved through valves 21, 21' and 21" into a pipe 20 through which it is returned to the inlet of the circulating pump 11.

Instead of exerting the desired pressure on the liquid in the accumulator 6 by means of a compressed gas a piston 32 provided with a suitable packing 33 may be used, as shown in FIG. 2. This piston is pressed against the liquid by a spring 34 whose upper end abuts against the inside of the top of the vessel 6 which, in this case, preferably has a cylindrical configuration. A piston rod 35 extends through the top which rod may be provided with a scale or other suitable means for indicating the liquid level in the vessel 6 so that the liquid level gauge glasses 7 shown in FIG. 1 can be omitted.

The pressure of the liquid in the chambers 26 and 26' is maintained only slightly higher than the pressure in the chambers 28 and 28' which, because of leakage through the labyrinth packings 28", is substantially the same as the pressure inside the compressor, when the latter is standing still as well as when it is in operation. Therefore, the pressure of the medium passing through the compressor is counterbalanced by the pressure of the lubricating and cooling liquid and only very little pressure is exerted on the sealing ring 29 and 29' which are in gliding engagement with corresponding collars 36 and 37 on the shaft 2. The elasticity of the bellows 38 and 39 which connect the sealing rings 29 and 29', respectively, with walls 40 and 41, separating the cavity 26 from the cavity 28 and the cavity 26' from the cavity 28', is sufficient to produce a desired sealing pressure. For relieving the bellows, coil springs, not shown, which are coaxial of the bellows may be interposed between the sealing ring 29 and the wall 40 and between the sealing ring 29' and the wall 41.

I claim:

1. A turbomachine plant comprising a shaft, a rotor mounted on said shaft, a casing having a first compartment accommodating said rotor, a second compartment in said casing, said shaft extending through said second compartment, sealing means placed around said shaft in said second compartment, a bearing for said shaft placed in said second compartment, a fluid acting as sealing fluid around said sealing means and as coolant and lubricant in said bearing, a fully closed conduit circuit containing said fluid and including first conduit means connected to said bearing for supplying said fluid thereto, said second compartment receiving said fluid from said bearing, second conduit means connected to said second compartment for receiving said fluid therefrom and returning said fluid to said first conduit means, and pressure maintaining means connected to said conduit circuit for maintaining, at all times, including the standstill periods of said rotor, a predetermined pressure in said circuit which is at least as high as the highest operating pressure in said first compartment.

2. A turbomachine plant as defined in claim 1, said conduit circuit and said second compartment being completely filled, at all times, by said fluid.

3. A turbomachine plant as defined in claim 1 wherein said pressure maintaining means includes a vessel interposed in said conduit circuit for accumulating said fluid, and pressure producing means connected to said vessel for maintaining said predetermined pressure on the fluid in said vessel.

4. A turbomachine plant according to claim 3 wherein said fluid is in the liquid state, said vessel is not completely filled by said fluid, and said pressure producing means includes a source of supply of gas having a pressure which is at least as high as said predetermined pressure, said source of gas supply being connected to said vessel for filling the space in said vessel which is not occupied by said fluid with said gas.

5. A turbomachine plant as defined in claim 3 including cooling means connected to said vessel for cooling said fluid in said vessel.

References Cited in the file of this patent

UNITED STATES PATENTS

| | | |
|---|---|---|
| 1,709,896 | Carrier | Apr. 23, 1928 |
| 2,077,038 | Carrier | Apr. 13, 1937 |
| 2,854,296 | Eberle et al. | Sept. 30, 1958 |